(12) United States Patent
Ptacek et al.

(10) Patent No.: US 8,684,117 B2
(45) Date of Patent: Apr. 1, 2014

(54) METHODS AND SYSTEMS FOR COOLING IN A VEHICLE

(75) Inventors: Todd Adam Ptacek, Lawrence Park, PA (US); Scott Leute, Lawrence Park, PA (US); Patrick Allen, Boston, MA (US)

(73) Assignee: General Electric Company, Schenectady, NY (US)

( * ) Notice: Subject to any disclaimer, the term of this patent is extended or adjusted under 35 U.S.C. 154(b) by 204 days.

(21) Appl. No.: 13/163,028

(22) Filed: Jun. 17, 2011

(65) Prior Publication Data

US 2012/0318163 A1    Dec. 20, 2012

(51) Int. Cl.
*B60K 11/04*    (2006.01)

(52) U.S. Cl.
USPC .......... 180/68.2; 180/68.4; 165/271; 165/101

(58) Field of Classification Search
USPC .............. 180/68.1, 68.2, 68.3, 68.4; 165/271, 165/296, 41, 44, 96, 100, 101, 102, 103
See application file for complete search history.

(56) References Cited

U.S. PATENT DOCUMENTS

| | | | |
|---|---|---|---|
| 2,215,296 A * | 9/1940 | Ogden ........................... | 290/14 |
| 2,633,541 A | 3/1953 | Justus | |
| 4,339,014 A * | 7/1982 | Berth et al. .................. | 180/68.1 |
| 6,695,047 B2 * | 2/2004 | Brocksopp .................... | 165/292 |
| 6,749,043 B2 | 6/2004 | Brown et al. | |
| 6,981,386 B2 | 1/2006 | Young et al. | |
| 7,044,096 B2 | 5/2006 | Foesel et al. | |
| 7,721,855 B2 * | 5/2010 | Marsh et al. ........... | 188/264 AA |
| 7,921,946 B2 * | 4/2011 | Kumar ....................... | 180/65.29 |
| 2004/0149160 A1 | 8/2004 | Foesel et al. | |
| 2008/0276632 A1 | 11/2008 | Kumar | |

OTHER PUBLICATIONS

Search Report and Written Opinion from corresponding PCT Application No. PCT/US2012/042123 dated Apr. 29, 2013.

* cited by examiner

*Primary Examiner* — John Walters
(74) *Attorney, Agent, or Firm* — GE Global Patent Operation; John A. Kramer

(57) ABSTRACT

Various methods and systems are provided for a vehicle with an engine system and a power dissipation system. One example method includes, during directing airflow from an airflow generating device to cool a component of the power dissipation system, and directing the airflow from the airflow generating device to cool a component of the engine system.

19 Claims, 7 Drawing Sheets

METHODS AND SYSTEMS FOR COOLING IN A VEHICLE

FIELD

Embodiments of the subject matter disclosed herein relate to methods and systems for cooling various components in a vehicle including an internal combustion engine.

BACKGROUND

A propulsion system for a vehicle may include one or more traction motors to generate tractive output to propel and retard forward and reverse motion of the vehicle. In some examples, such as in a rail vehicle application, the traction motors may be used for dynamic braking in which the traction motors convert kinetic energy of the vehicle into electrical energy which is transmitted to one or more grids of resistive elements that dissipate the electrical energy in the form of heat. As such, an airflow generating device may be provided to cool the one or more grids of resistive elements during dynamic braking operation, as a temperature of the one or more grids of resistive elements increases during dynamic braking operation.

Further, during vehicle operation, various other engine components may require cooling. As one example, during full load engine operation, engine coolant temperature may increase and additional airflow from an additional airflow generating device may be desired to assist cooling of the engine coolant provided by a heat exchanger or the like. In some vehicles, however, packaging constraints may reduce an amount of space available for the additional airflow generating device.

BRIEF DESCRIPTION

In one embodiment, a method for a vehicle with an engine system and a power dissipation system is provided. The method includes, directing airflow from an airflow generating device to cool a component of the power dissipation system, and directing the airflow from the airflow generating device to cool a component of the engine system.

In one embodiment, cooling of the component of the power dissipation system, such as one or more grids of resistive elements, may be used during dynamic braking operation of the vehicle during which engine load may be low, for example. In contrast, cooling of the component of the engine system, such as a heat exchanger, may be used during frill engine load conditions when a temperature of engine coolant may increase. Because cooling of the component of the power dissipation system and cooling of the component of the engine system may be performed at different times, a single airflow generating device may provide cooling to both the component of a power dissipation system and the component of an engine system, at least during selected operating conditions. Further, in another embodiment, a method may adjust the airflow generating device to increase airflow to one component while decreasing airflow to the other component depending on an operating condition to provide cooling where most effective. In still another embodiment, flow may be maintained to both components during some operating conditions, to thus provide cooling to the component of the power dissipation system and the component of the engine system simultaneously. As such, packaging space may be maintained as additional cooling of the component of the engine system may be carried out without adding an airflow generating device to the vehicle, although an additional airflow device may be used if desired.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

The following description relates to various embodiments of methods and system for a vehicle with an engine system and a power dissipation system. In one example embodiment, a method includes, directing airflow from an airflow generating device to cool a component of the power dissipation system, and directing the airflow from the airflow generating device to cool a component of the engine system. In such an embodiment, cooling may be provided to the component of the power dissipation system and the component of the engine system by a single airflow generating device, as cooling of each of the components may be desired at different times. As an example, cooling of the component of the power dissipation system may be desired during dynamic braking operation when the engine load is low and electrical energy is transferred to the power dissipation system. On the other hand, cooling of the component of the engine system may be desired when the engine load is high and a temperature of the component of the engine system may be relatively high. In some examples, the airflow generating device may be adjusted such that a portion of the airflow is directed to one component, while the remaining portion is directed to the other component. The relative flows between the components may be adjusted responsive to respective exhaust gas recirculation (EGR) temperature, grid temperature, engine operating conditions and/or additional parameters as described herein. In this manner, the airflow generating device may simultaneously provide cooling to the component of the power dissipation system and the component of the engine system, if desired.

Figure 1:
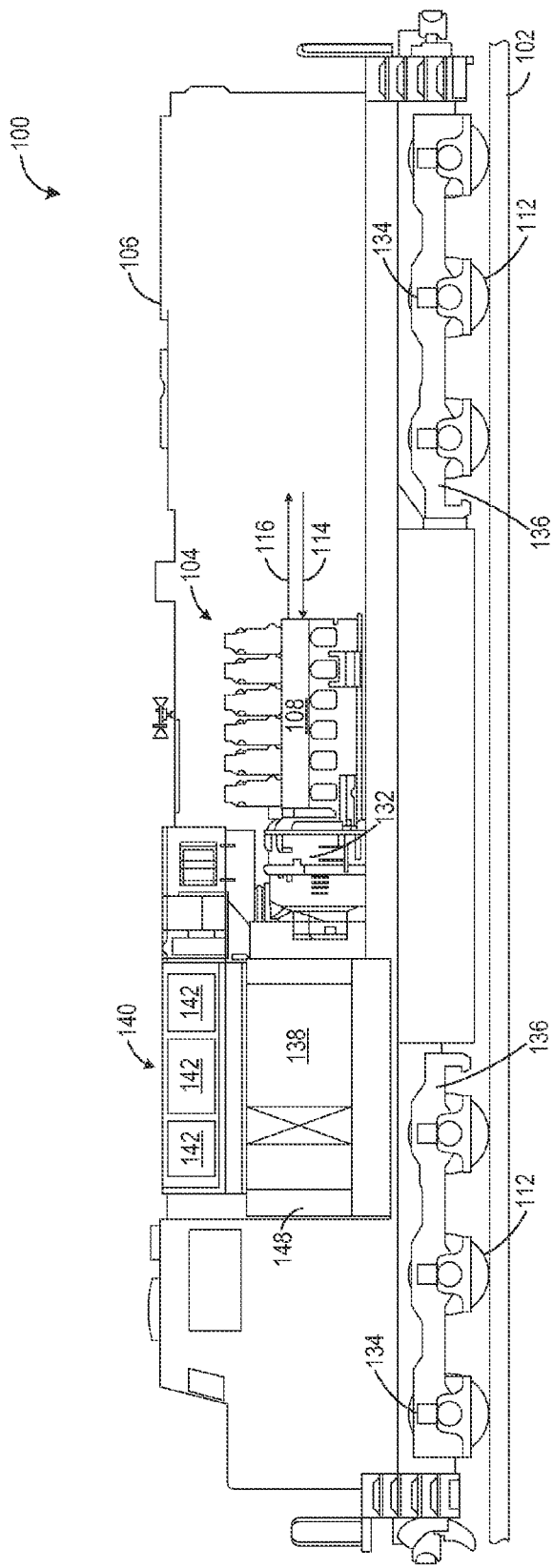
FIG. 1 shows a schematic diagram of a rail vehicle according to an embodiment of the invention.

In some embodiments, the method may be configured for an engine in a vehicle, such as a locomotive or other rail vehicle. For example, FIG. 1 shows a schematic diagram of an example embodiment of a vehicle system 100, herein depicted as a rail vehicle 106, configured to run on a rail 102 via a plurality of wheels 112. As depicted, the rail vehicle 106 includes an engine system 104 with an engine 108, such as an internal combustion engine. In other non-limiting embodiments, the engine 108 may be a stationary engine, such as in a power-plant application, or an engine in a ship or off-highway vehicle propulsion system. Further, six cylinders of a twelve cylinder engine are shown in FIG. 1. In other embodiments, the engine 108 may be a V-6, V-8, V-10, V-12, V-16, I-4, I-6, I-8, opposed 4, or another engine type.

The engine 108 receives intake air for combustion from an intake passage 114. The intake passage 114 receives ambient air from an air filter (not shown) that filters air from outside of the rail vehicle 106. Exhaust gas resulting from combustion in the engine 108 is supplied to an exhaust passage 116. Exhaust gas flows through the exhaust passage 116, and out of an exhaust stack (not shown) of the rail vehicle 106. In one embodiment, the engine 108 is a diesel engine that combusts air and diesel fuel through compression ignition. In other non-limiting embodiments, the engine 108 may combust fuel including gasoline, kerosene, biodiesel, or other petroleum distillates of similar density through compression ignition (and/or spark ignition).

In one embodiment, the rail vehicle 106 is a diesel-electric vehicle. Alternatively, the locomotive may be fully electric. As depicted in FIG. 1, the engine 108 is coupled to an electric power generation system, which includes an alternator/generator 132 and electric traction motors 134. For example, the engine 108 is a diesel engine that generates a torque output that is transmitted to the generator 132 which is mechanically coupled to the engine 108. The generator 132 produces electrical power that may be stored and applied for subsequent propagation to a variety of downstream electrical components. As an example, the generator 132 may be electrically coupled to a plurality of traction motors 134 via an electric transmission system 138, and the generator 132 may provide electrical power to the plurality of traction motors 134. The electric transmission system 138 may include frequency converters, such as rectifiers.

As depicted, the plurality of traction motors 134 are mounted on a truck frame 136, and are each connected to one of a plurality of wheels 112 to provide tractive power to propel and retard the motion of the rail vehicle 106. One example rail vehicle configuration includes one traction motor per wheel. As depicted herein, six pairs of traction motors correspond to each of six pairs of wheels of the rail vehicle. The traction motors 134 may receive electrical power from the generator 132 via a DC bus (not shown) to provide tractive power to the rail vehicle 106. As described herein, each traction motor 134 may be an AC motor. Accordingly, an inverter may be paired with the traction motor to convert the DC input to an appropriate AC input, such as a three-phase AC input, for subsequent use by the traction motor. In alternate embodiments, each traction motor 134 may be a DC motor directly employing the output of the alternator/generator 132 after rectification and transmission along the DC bus. One example locomotive configuration includes one inverter/traction motor pair per wheel axle.

The traction motors 134 may act as generators providing dynamic braking to reduce a speed of the rail vehicle 106. In particular, during dynamic braking, the traction motor may provide torque in a direction that is opposite from the rolling direction thereby generating electricity that is dissipated as heat by one or more grids of resistors connected to the electrical bus, the grids of resistors arranged in one or more stacks. In one example, the vehicle system 100 includes a power dissipation system 140 with three stacks 142 of grids of resistive elements connected in series directly to the electrical bus. In other embodiments, the vehicle system may include another suitable number of stacks of resistive element grids. As depicted in FIG. 1, the power dissipation system may be positioned proximate to the ceiling of a hood of the rail vehicle 106 in order to facilitate air cooling and heat dissipation from the grid. As will be described in greater detail below, power dissipation system may be additionally or alternatively force-air cooled by an airflow generating device which may be coupled to the power dissipation system 140. Alternatively, other suitable power dissipation system configurations may be implemented.

In some embodiments, dynamic braking may be performed in conjunction with air braking. As such, air brakes (not shown) which use compressed air may be provided in the vehicle system 100 as part of a vehicle braking system.

As depicted in FIG. 1, the vehicle system 100 further includes a controller 148 to control various components related to the vehicle system 100. As an example, various components of the vehicle system may be coupled to the controller 148 via a communication channel or data bus. In one example, the controller 148 includes a computer control system. The controller 148 may additionally or alternatively include non-transient computer readable storage media (not shown) including code for enabling on-board monitoring and control of rail vehicle operation. The controller 148, while overseeing control and management of the vehicle system 100, may be configured to receive signals from a variety of engine sensors, as further elaborated herein, in order to determine operating parameters and operating conditions, and correspondingly adjust various engine actuators to control operation of the rail vehicle 106. For example, the controller 148 may receive signals from various engine sensors including, but not limited to, engine speed, engine load, intake manifold air pressure, coolant temperature, exhaust pressure, ambient pressure, ambient temperature, exhaust temperature, etc. Correspondingly, the controller 148 may control the vehicle system 100 by sending commands to various components such as the traction motors 134, the alternator/generator 132, cylinder valves, fuel injectors, etc. Other actuators may be coupled to various locations in the rail vehicle.

In one example, the controller may receive communication from a temperature sensor indicating a temperature of the one or more stacks 142 of resistive elements is greater than a threshold temperature. In response, the controller may control an airflow generating device to direct an airflow to the stacks 142 to absorb heat from the resistive elements, as will be described in greater detail below.

In some embodiments, the vehicle system may further include a control module. The control module may be hardware and/or software having control functionality as indicated. Hardware and/or software module refers to one or more electronic components and/or sets of machine readable instructions, sorted on a non-transitory medium, that perform or cause to be performed one or more designated functions. The control module may be a stand atone unit, or part of a vehicle controller, such as the controller 148, or other control unit or system on the vehicle.

In some examples, the engine system 104 may further include an exhaust gas recirculation (EGR) system (not shown) which routes exhaust gas from the exhaust passage 116 to the intake passage 114. By introducing exhaust gas to the engine 108, the amount of available oxygen for combustion is decreased, thereby reducing the combustion flame temperatures and reducing the formation of nitrogen oxides (e.g., $NO_x$). In some embodiments, the EGR system may include an EGR cooler to reduce the temperature of the exhaust gas before it enters the intake passage 114.

In other examples, the engine system 104 may further include a turbocharger that is arranged between the intake passage 114 and the exhaust passage 116. The turbocharger may be provided to increase an air charge of ambient air drawn into the intake passage 114 in order to provide greater charge density during combustion to increase power output and/or engine-operating efficiency.

In one embodiment, a system for a vehicle comprises an airflow guidance device comprising a plenum and at least one adjustable vane, wherein the plenum has an interior, an input, and first and second outputs, and wherein the at least one adjustable vane is connected to the plenum in the interior between the input and the first and second outputs. The system further comprises a control module configured to operate the at least one adjustable vane, based on operating conditions of a vehicle, to a first position of the at least one adjustable vane and to a second position of the at least one adjustable vane, wherein in the first position the at least one adjustable vane is configured to direct airflow entering the input to the first output and wherein in the second position the at least one adjustable vane is configured to direct the airflow to the second output.

In one example, the system further comprises first ducting configured to fluidly couple the first output with the component of the power dissipation system of the vehicle and second ducting configured to fluidly couple the second output with the component of the engine system of the vehicle.

In some embodiments, a system for a vehicle may include a dynamic braking package including an airflow guidance device comprising a plenum and at least one adjustable vane, wherein the plenum has an interior, an input, and first and second outputs, and wherein the at least one adjustable vane is connected to the plenum in the interior between the input and the first and second outputs. The system further comprises a control module configured to operate the at least one adjustable vane, based on operating conditions of a vehicle, to a first position of the at least one adjustable vane and to a second position of the at least one adjustable vane, wherein in the first position the at least one adjustable vane is configured to direct airflow entering the input to the first output and wherein in the second position the at least one adjustable vane is configured to direct the airflow to the second output. The dynamic braking package may further include a plurality of resistive elements configured to dissipate electrical energy as heat, and first ducting fluidly coupling the first output with the plurality of resistive elements.

Figure 2:
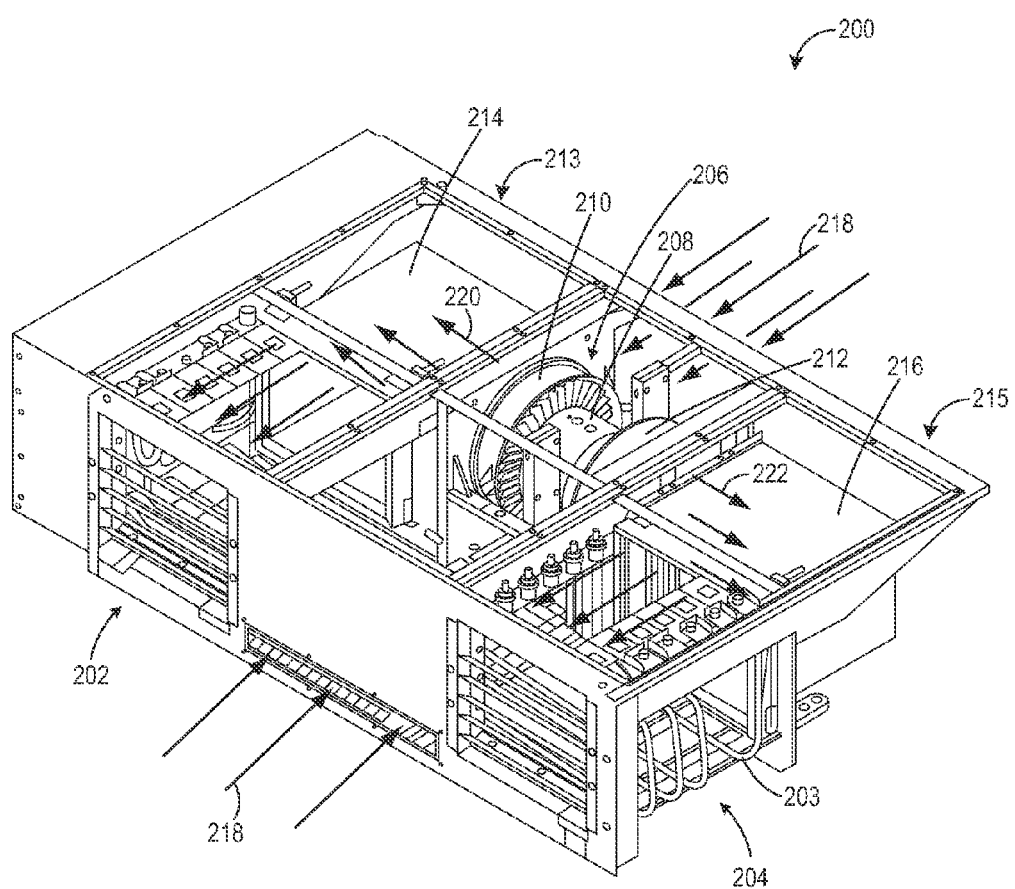
FIG. 2 shows a perspective view, approximately to scale, of a power dissipation system according to an embodiment of the invention.

FIGS. 2-5 show a power dissipation system 200, such as a power dissipation system described in the above embodiments. The power dissipation system 200 includes two stacks 202 and 204 of grids 203 of resistive elements, which may dissipate electrical energy generated by traction motors in the form of heat. As an example, the power dissipation system may be an electrical power dissipation system including one or more electronics components (e.g., resistive elements). As described above, the electrical energy from the traction motors may be sent through an electrical bus to the stacks 202 and 204. The stacks 202 and 204 of grids 203 of resistive elements may be connected in series, for example, such that one stack of grids may be used at one time if desired. In some embodiments, the power dissipation system may include a plurality of resistive elements that are not in a grid and/or stack form. In other embodiments, the power dissipation system may include a plurality of resistive elements which form a single grid. It should be understood FIG. 2 is provided as an example power dissipation system, and a power dissipation system may include any suitable number of resistive elements, and the resistive elements may or may not form one or more grids.

The power dissipation system 200 further includes an airflow generating device 206, which provides forced-air cooling to the power dissipation system 200. As depicted in FIGS. 2-5, the airflow generating device 206 includes a double-ended electric motor 208 with two fans 210 and 212 or blowers. In some examples, the airflow generating device 206 may be driven by current supplied to the grids 203 of resistive elements. In other examples, the airflow generating device 206 may be controlled by contactors electrically coupled to the electric power generation system of the vehicle. In another example, the airflow generating device 206 maybe driven by a variable speed drive. In alternative embodiments, a single motor may provide power to a single fan. In still other embodiments, the motor may have a single speed (e.g., on and off) or the fan may have three speeds (e.g., quarter, half, and full). It should be noted, in embodiments in which there are more than two stacks of resistive element grids, more than one airflow generating device may be provided; thus, any suitable number of airflow generating devices may be included in a vehicle system.

Figure 3:
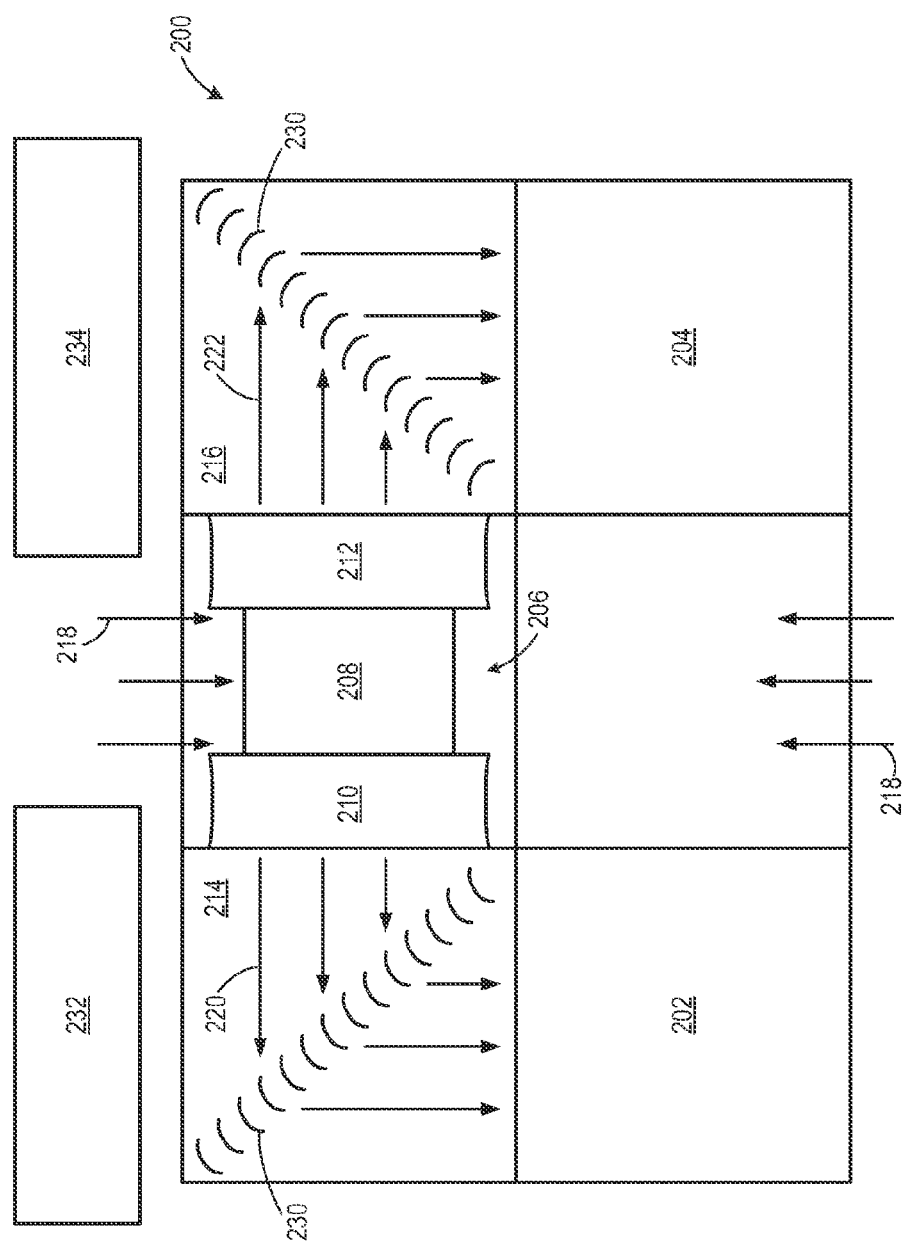
FIG. 3 shows a schematic diagram of a cross-section of a power dissipation system according to an embodiment of the invention.

As depicted in FIGS. 2-5, intake air 218 enters the fans 210 and 212 from two sides of the power dissipation system 200. The intake air may be ambient air from outside of the vehicle in which the power dissipation system is positioned, for example. Further, the power dissipation system 200 includes two airflow guidance devices which each include a plenum and at least one adjustable vane. In the example shown in FIG. 2, the power dissipation system 200 includes airflow guidance device 213 with plenums 214 and airflow guidance device 215 with 216 which receive airflow from the fans 210 and 212, respectively. As shown in FIGS. 2-3, the plenums 214 and 216 direct the airflow from the fans 210 and 212 to the stacks 202 and 204 of grids of resistive elements, thereby cooling the resistive elements. For example, the fan 210 provides an airflow 220 to the plenum 214 which directs the airflow 220 to the stack 202 of resistive element grids, and the fan 212 provides a different airflow 222 to the plenum 216 which directs the airflow 222 to the stack 204 of resistive element grids.

Figure 5:
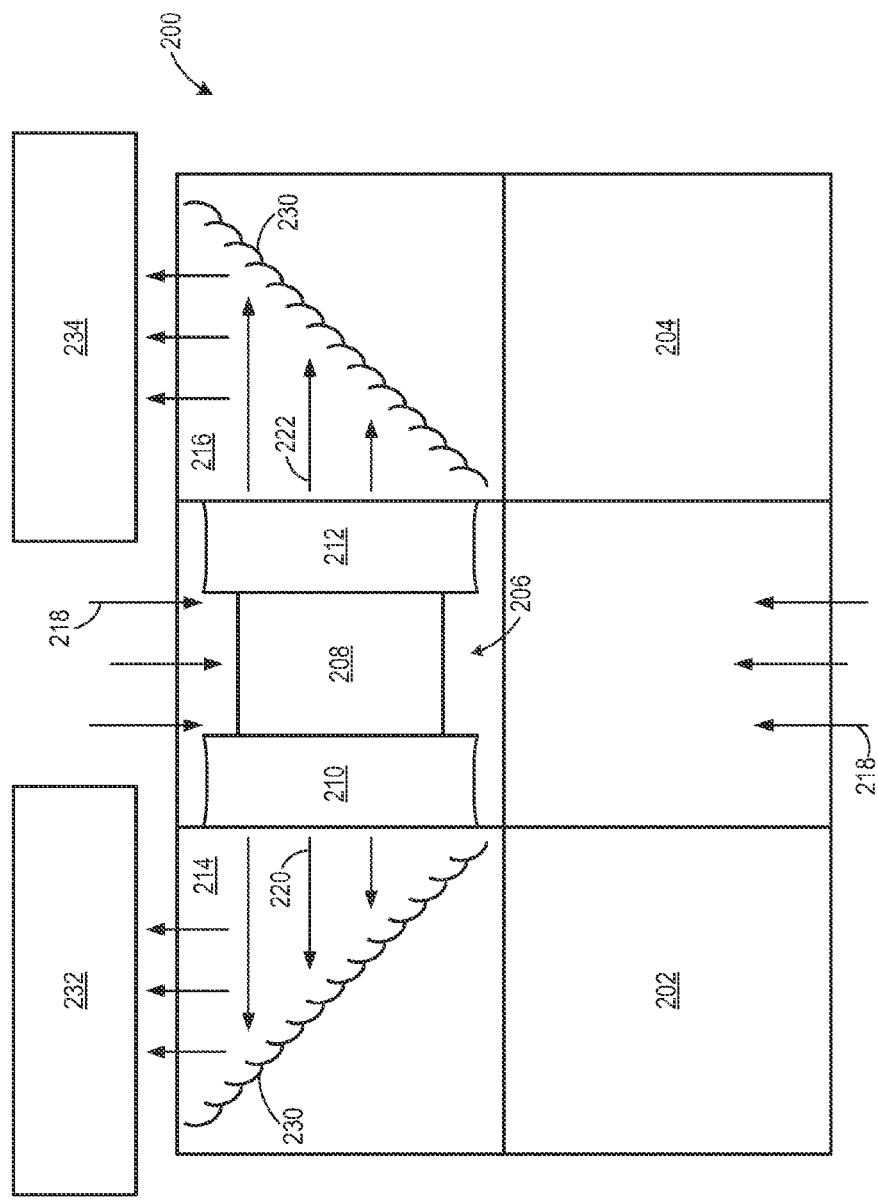
FIG. 5 shows a schematic diagram of a cross-section of a power dissipation system according to an embodiment of the invention.

FIG. 3 shows a schematic diagram of a cross-sectional view of the power dissipation system 200. As depicted in FIG. 3, each plenum includes a plurality of vanes 230 which direct the airflow from the fans to a component of the power dissipation system 200. In other embodiments, each plenum may include one adjustable vane. The vanes may be adjustable vanes which are operable by a control module, for example, to direct the airflow in more than one direction. For example, FIG. 3 shows the adjustable vanes 230 in a first position in which the airflow is directed to the stacks 202 and 204 of grids of resistive elements. The controller may adjust the position of the vanes 230 during various operating conditions. For example, the vanes may be adjusted to the first position during a first condition, for example, in which the engine toad is less than a threshold, or when a temperature of the component of the power dissipation system (e.g., the resistive elements) is exceeds a threshold temperature. FIG. 5 shows the adjustable vanes 230 in a second position in which the airflow is directed to component 32 and 234 of the engine system, as will be described below. The vanes 230 may be adjusted to the second position during a second condition, for example, in which the engine load is greater than a threshold, or when a temperature of the component 232 or 234 is greater than a threshold temperature.

In some embodiments, the plurality of adjustable vanes 230 in the plenum 214 may be adjusted independently of the plurality of adjustable vanes 230 in the plenum 216. In such an embodiment, one of the fans may be used to cool a component of the power dissipation system and the other fan may be used to cool a component of the engine system simultaneously.

Figure 4:
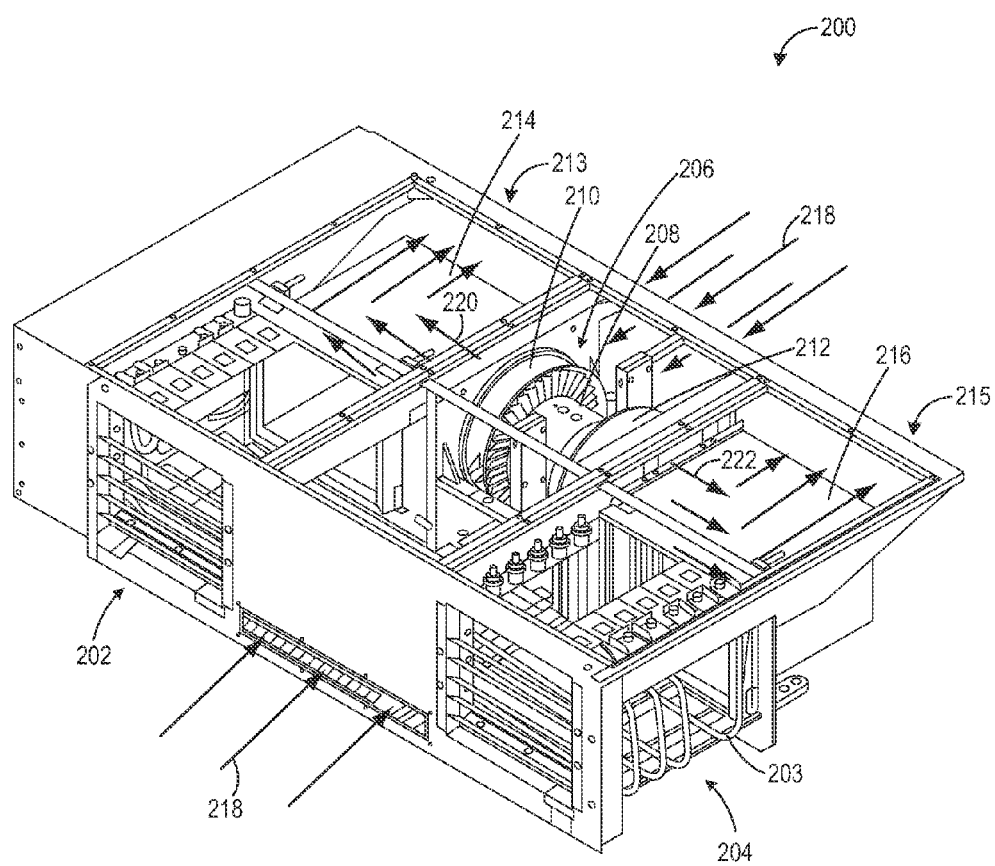
FIG. 4 shows a perspective view, approximately to scale, of a power dissipation system according to an embodiment of the invention.

FIG. 4 shows the power dissipation system 200 with the airflow 220 and the airflow 222 from the fans 210 and 212, respectively, directed away from the stacks 202 and 204. The plenums 214 and 216 direct the airflow from the fans 210 and 12 to a component of an engine system, thereby cooling the component of the engine. For example, as shown in FIG. 5, the fan 210 provides an airflow 220 to the plenum 214 which directs the airflow 220 to the component 232 of the engine system, and the fan 212 provides a different airflow 222 to the plenum 216 which directs the airflow 222 to the component 234 of the engine system.

In some examples, the component 232 of the engine system may be the same component 234 of the engine system. In other examples, the component 232 of the engine system may be different than the component 234 of the engine system. As a non-limiting example, the components 232 and 234 of the engine system may be a heat exchanger, such an air-to-air heat exchanger, an air-to-oil heat exchanger, or an air-to-water heat exchanger. For example, the components 232 and 234 of the engine system may be an EGR cooler which cools exhaust gas recirculation, an intercooler or aftercooler which cools intake air before it enters the engine, or a radiator of the engine which cools engine coolant or engine oil.

In one example embodiment, the airflow generating device 206 may provide an airflow to cool an EGR cooler when the plurality of adjustable vanes are in the second position. In such an embodiment, the EGR may be controlled to be cooled to two different temperatures. As an example, the EGR cooler alone may cool the exhaust gas to a first temperature, and the EGR cooler with additional air from the airflow generating device of the power dissipation system may cool the exhaust gas to a second, lower temperature. In this manner, the temperature of the exhaust gas that is recirculated to the engine may be controlled over a range of engine operating conditions such that $NO_x$ emission may be reduced while reducing an impact of EGR on specific fuel consumption.

Thus, a power dissipation system may include one or more stacks of resistive element grids which dissipate electrical energy generated during dynamic braking of a vehicle as heat. The power dissipation system may further include an airflow generating device coupled between the one or more stacks of resistive element grids and a heat exchanger of an engine system via a plenum. The plenum may include a plurality of adjustable vanes operable to direct an airflow from the airflow generating device to the stacks of resistive elements or to the heat exchanger based on an operating condition. As such, the airflow generating device of the power dissipation system may be used to cool a component of the power dissipation system and a component of the engine system, as a need for cooling of the component of the power dissipation system and a need for cooling of the component of the engine system may occur at different times. In this manner, a packaging space of the vehicle system may be maintained, as a need for a second airflow generating device for the component of the engine system is reduced.

In another example embodiment, the plurality of adjustable vanes may be configured such that they are continually adjustable. In such an embodiment, continuous adjustment of the vanes may provide blended cooling of a component of the power dissipation system and a component of the engine cooling system responsive to operating conditions to adjust a division of the total flow to among two systems, where the ratio of the division is adjusted to provide increased flow to the power dissipation system during dynamic braking and/or low engine load conditions, and to provide increased flow to the engine cooling system during increased engine loading conditions, and/or increased EGR temperature conditions. For example, the vanes may be adjusted in a continuous mode in order to route a percentage of airflow to the component of the power dissipation system and a percentage of airflow to the component of the engine system, thereby cooling both components simultaneously but to greater or lesser degrees depending on the selected percentage. As another example, the plurality of vanes may be adjusted such that a portion of the plurality of vanes are positioned to direct airflow to the component of the power dissipation system, and the remaining portion of the plurality of vanes are positioned to direct airflow to the component of the engine system. In this way, the component of the power dissipation system and the component of the engine may be cooled at the same time.

in one example, distinct portions of the airflow may be selectively directed from the airflow generating device to cool at least one of the component of the power dissipation system or the component of the engine system based on an operating condition of the vehicle.

In another example, based on an operating condition of the vehicle, airflow portions may be selectively directed from the airflow generating device: in a first mode, to cool the component of the power dissipation system only; in a second mode, to cool the component of the engine system only; and in a third mode, respective portions are directed to cool the component of the power dissipation system and the component of the engine system.

In some examples, a vehicle system may be retrofitted with a power dissipation system as described in any of the embodiments herein. As a non-limiting example, a module or kit may be provided for installing the power dissipation system including a current generating device which may direct air to a component of the power dissipation system and to a component of an engine system. In one embodiment, the kit may include adjustable vanes to replace existing vanes in a plenum of the power dissipation system. In another embodiment, the kit may include a plenum with adjustable vanes to replace an existing plenum.

In some embodiments, a power dissipation system as described in any of the embodiments herein may be installed to provide simultaneous cooling of components in a fuel cell system.

Figure 6:
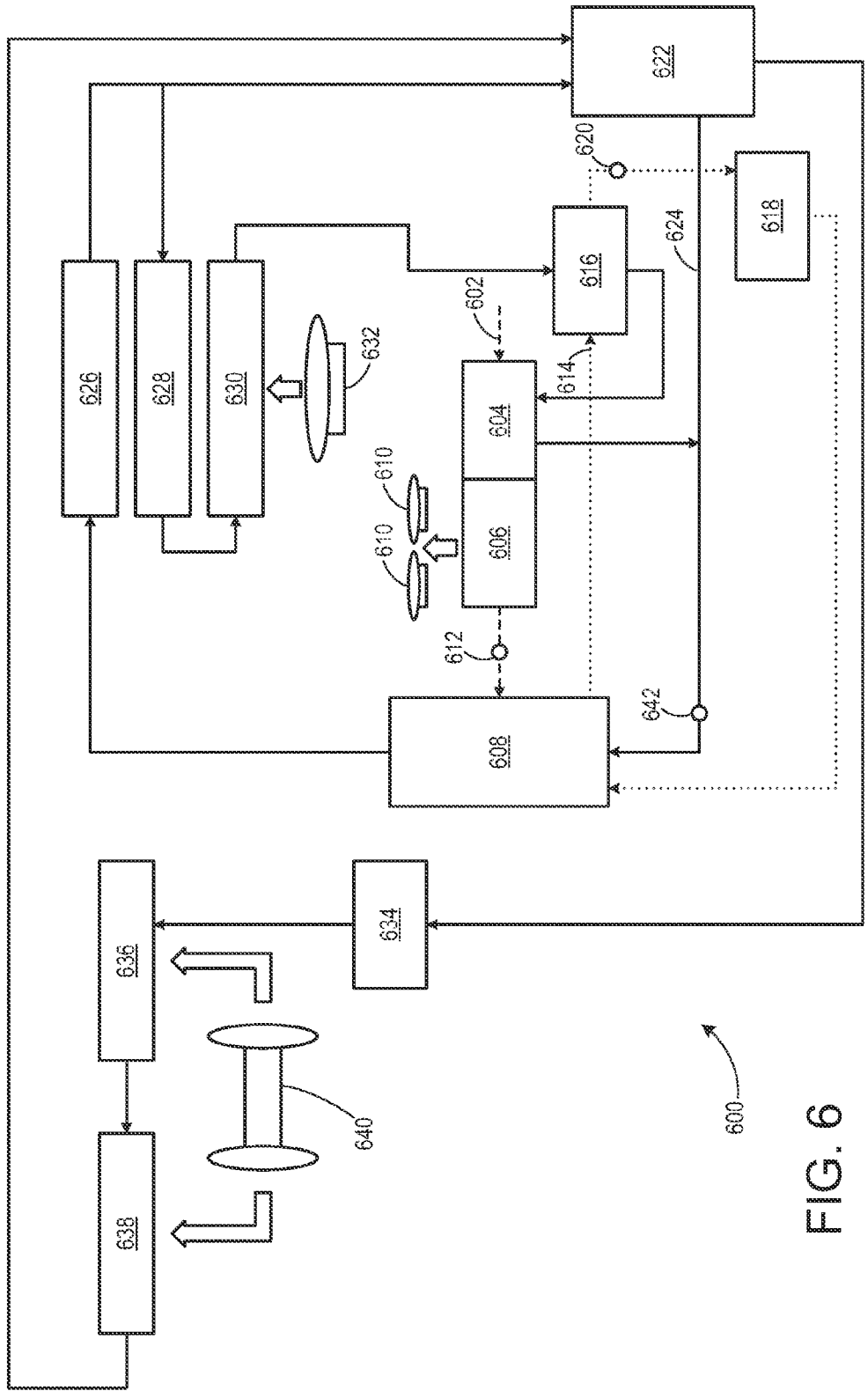
FIG. 6 shows a cooling circuit for an engine system according to an embodiment of the invention.

Continuing to FIG. 6, a cooling circuit 600 for an engine system, such as engine system 104 described above with reference to FIG. 1, is shown. In the example embodiment of FIG. 6, the solid lines shown in FIG. 6 indicate the flow path of engine coolant 624 (e.g., water), the dashed lines indicate the flow path of intake air 602 which is compressed by a turbocharger, and the dotted lines indicated a flow path of engine oil 614.

As depicted, compressed intake air 602 (e.g., air that has passed through a compressor of a turbocharger) passes through a water-based intercooler 604 (e.g., an air-to-water heat exchanger) and an air-to-air intercooler 606 (e.g., an air-to-air heat exchanger) before entering the engine 608 for combustion. The engine 608 may be a diesel engine that combusts air and diesel fuel through compression ignition, such as the engine 108 described above with reference to FIG.

1. Air from the air-to-air intercooler 606 may be provided to airflow generating devices 610, such as fans or blowers, to provide cooling to another component of the engine system, for example. The cooling circuit may further include a manifold air temperature sensor 612 positioned between the air-to-air intercooler 606 and the engine 608 to measure a temperature of the air charge.

Engine oil 614 may be circulated through a plate heat exchanger 616 (e.g., an oil-to-water heat exchanger) to cool the oil and an oil filter 618 to clean the oil before circulating through the engine 608. Further an oil temperature sensor 620 may be included along the oil flow path to measure the temperature of the oil after it passes through the plate heat exchanger.

The cooling circuit further includes a tank 622 for holding coolant which passes through the cooling circuit 600. Although one tank is shown in FIG. 6, the cooling circuit may include any suitable number of tanks in other embodiments. Coolant 624 flows from the tank 622 to the engine 608. As depicted in the example embodiment of FIG. 6, the cooling circuit may include an engine coolant temperature sensor 642 positioned between the tank 622 and the engine 608 to measure a temperature of the engine coolant before it enters the engine 608.

After passing through the engine 608, the engine coolant 624 passes through a single-pass radiator 626 (e.g., a water-to-air heat exchanger). A portion of the engine coolant that passes through the radiator 626 returns to the coolant tank 622, and the remaining portion of coolant that that passes through the radiator 626 passes through a first single-pass sub-cooler 628 (e.g., a water-to-air heat exchanger) followed by a second single-pass sub-cooler 630 (e.g., a water-to-air heat exchanger) in order to reduce a temperature of the engine coolant. In other embodiments, the engine coolant may only pass through the radiator or it may only pass through the radiator and the first single-pass sub-cooler. The temperature of the engine coolant may be further reduced by airflow from an airflow generating device, such as a fan or blower 632. Next, the engine coolant passes through the plate heat exchanger 616 before passing though the water-based intercooler 604 and joining with the flow of engine coolant 624 to the engine 608.

Coolant from the coolant tank 622 is further supplied to an EGR cooler 634 (e.g., air-to-water intercooler) to cool the exhaust gas passing through the EGR cooler before it enters the cylinders of the engine for combustion. The coolant then passes through a first single-pass radiator 636 (e.g., air-to-water intercooler) and a second single-pass radiator 638 (e.g., air-to-water intercooler), such that the coolant is cooled before returning to the tank 622. During some operating conditions, such as full engine load, upon passing through the single-pass radiators 636 and 638, the coolant may be further cooled by airflow from an airflow generating device 640, such as the airflow generating device 206 of the power dissipation system 200 described above. In some embodiments, the EGR cooler 634 and the single-pass radiators 636 and 638 may have a separate coolant tank than the other components of the coolant circuit, such that the coolant that passes through the EGR cooler 634 may be maintained at a different temperature than the coolant that passes through the engine.

Thus, airflow from an airflow generating device of a power dissipation system may be used to further cool engine coolant as it passes through an engine coolant circuit.

Figure 7:
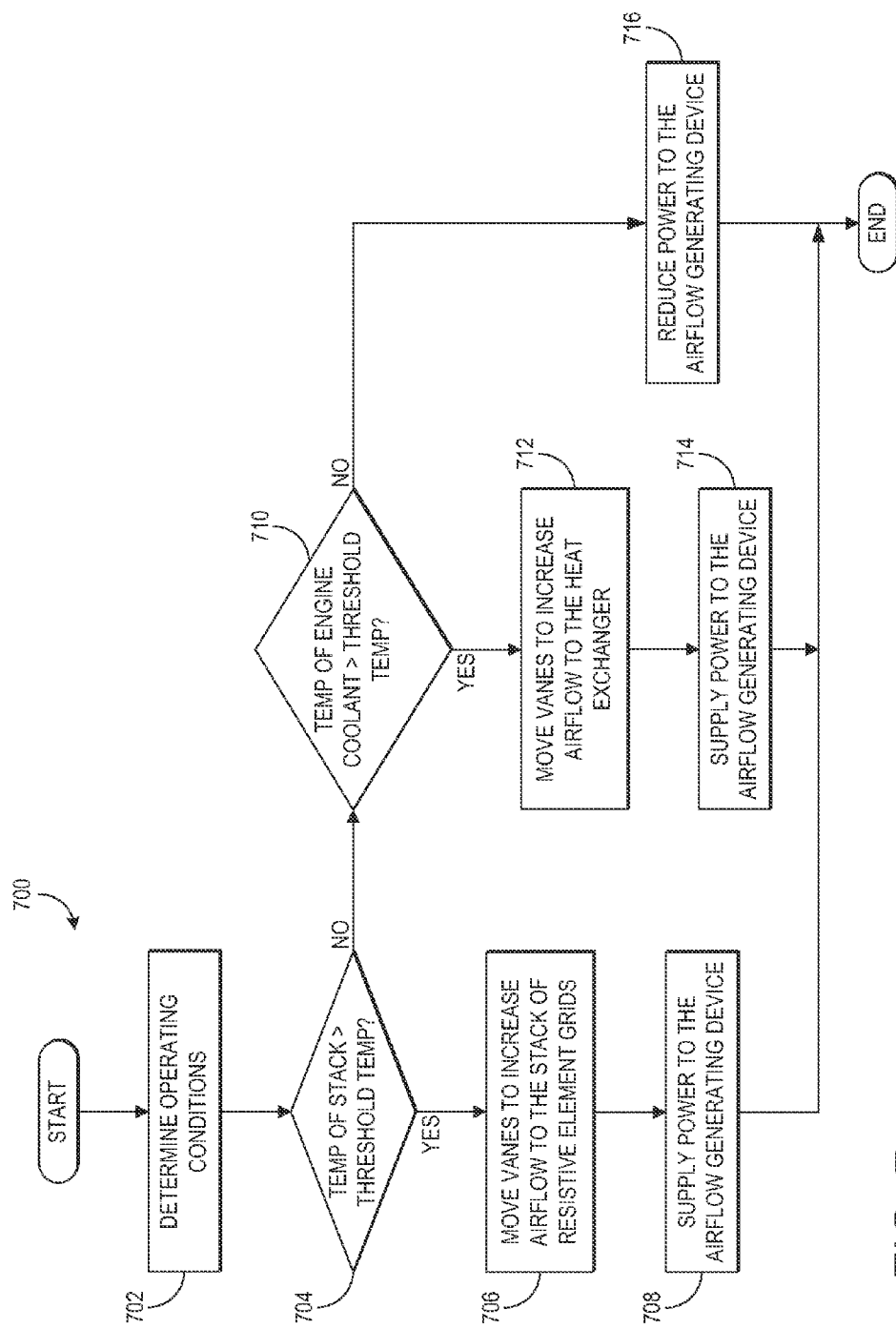
FIG. 7 shows a flow chart illustrating a method for a system according to an embodiment of the invention.

FIG. 7 shows a flow chart illustrating an example method 700 for controlling an airflow generating device in a vehicle system, such as the airflow generating device 206 described above with reference to FIGS. 2-5. Specifically, the method determines current operating conditions and adjusts the direction of the airflow of the airflow generating device accordingly.

At 702 of method 700, operating conditions of the vehicle system are determined. The operating conditions may include engine load, engine coolant temperature, dynamic braking operation, manifold air temperature, and the like.

Once the engine operating conditions are determined, method 700 continues to 704 where it is determined if a temperature of one or more stacks of grids of resistive elements are greater than a first threshold temperature. The temperature of the stacks of grids may increase during dynamic braking operation, for example.

If it is determined that the temperature of the one or more stacks of grids of resistive elements exceeds the first threshold temperature, method 700 proceeds to 706 and the adjustable vanes of the plenum coupled between the heat exchanger and the stack of resistive element grids are adjusted to increase airflow to the stack of resistive element grids. In one example, one or more of the plurality of vanes, but not all of the plurality of vanes, may be adjusted to increase the airflow to the stack of resistive element grids (and correspondingly decrease flow to the engine cooling component). In this manner, the stack of resistive element grids may be cooled while still providing at least some cooling to a heat exchanger of an engine system. In another example, each the plurality of vanes may be moved to a first position, such as the first position shown in FIG. 3, to direct substantially all of the airflow from the airflow generating device to the stack of resistive element grids.

At 708 of method 700, power is supplied to the airflow generating device to such that an airflow is generated. As described above, power may be supplied to the airflow generating device from the current flowing to the resistive elements from the traction motors. In other examples, power may be supplied to the airflow generating device by switching a contactor in the electric power generation system.

On the other hand, if it is determined that the temperature of the one or more stacks of resistive element grids is less than the first threshold temperature, method 700 moves to 710 where it is determined if a temperature of the engine coolant is greater than a second threshold temperature. The engine coolant temperature may exceed a threshold temperature under high engine loads, for example. In some examples, the first threshold temperature and the second threshold temperature may be the same temperature. In other examples, the first threshold temperature may be greater than the second threshold temperature. In still other examples, the second threshold temperature may be greater than the first threshold temperature.

If it is determined that the temperature of the engine coolant is less than second the threshold temperature and cooling of the heat exchanger is not desired, method 700 moves to 716 and power to the airflow generating device is reduced, in contrast, if it is determined that the temperature of the engine coolant exceeds the second threshold temperature, method 700 continues to 712 where the adjustable vanes of the plenum coupled between the heat exchanger and the stack of resistive element grids are adjusted to increase airflow to the heat exchanger. In one example, one or more of the plurality of vanes, but not all of the plurality of vanes, may be adjusted to increase the airflow to the heat exchanger (and correspondingly decrease flow to the resistive element grids). In this manner, the heat exchanger may be cooled while still providing at least some cooling to the stack of resistive element grids of the power dissipation system. In another example, each of the plurality of vanes may be moved to a second position, such as the position shown in FIG. 5, to direct substantially all of the airflow from the airflow generating device to the heat exchanger. At 714 of method 700, power is supplied to the airflow generating device such that an airflow is generated to cool the heat exchanger of the engine system.

Thus, cooling of one or more stacks of resistive elements grids of a power dissipation system and cooling of a heat exchanger of an engine system may be carried out by a single airflow generating device, as cooling of the components may occur under different conditions or at reduced rates. In this manner, a packaging space of the vehicle system may be maintained, for example, as a need for a second airflow generating device for the component of the engine system is reduced.

Although certain embodiments of the invention have been illustrated herein as relating to selectively cooling an engine system component and a component of a power dissipation system, such embodiments are also applicable to selectively cooling an engine system component and a component of an electronics system. Additionally, in one aspect, the power dissipation system includes one or more electronic components used for, or otherwise relating to, electrical power dissipation, e.g., resistive elements.

Some embodiments are illustrated as including a plurality of adjustable vanes. In another embodiment, a system has at least one adjustable vane, e.g., a single vane. The single vane could be a door, for example.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for a vehicle with an engine system and a power dissipation system, comprising:
    directing airflow from an airflow generating device to cool a component of the power dissipation system; and
    directing the airflow from the airflow generating device to cool a component of the engine system, wherein directing airflow from the airflow generating device to cool the component of the power dissipation system includes increasing the airflow to the component of the power dissipation system when an engine load is less than a threshold, and directing airflow from the airflow generating device to cool the component of the engine system includes increasing the airflow to the component of the engine system when the engine load is greater than the threshold.

2. The method of claim 1, wherein directing the airflow from the airflow generating device to cool the component of the power dissipation system further includes increasing the airflow to the component of the power dissipation system when a temperature of the component of the power dissipation system is greater than a first threshold temperature, and directing airflow from the airflow generating device to cool the component of the engine system includes increasing the airflow to the component of the engine system when a temperature of the component of the engine system is greater than a second threshold temperature.

3. The method of claim 1, wherein the component of the engine system is one of an air-to-air heat exchanger, an air-to-oil heat exchanger, or an air-to-water heat exchanger.

4. The method of claim 1, wherein the component of the power dissipation system comprises a plurality of resistive elements which dissipate electrical energy generated during dynamic braking of the vehicle as heat.

5. A method for a vehicle with an engine system and a power dissipation system, comprising:
    directing airflow from an airflow generating device to cool a component of the power dissipation system; and
    directing the airflow from the airflow generating device to cool a component of the engine system, wherein the airflow generating device is coupled between the component of the engine system and the component of the power dissipation system via a plenum, and directing the airflow includes adjusting a plurality of adjustable vanes in the plenum.

6. The method of claim 5, wherein the plurality of adjustable vanes direct the airflow to the component of the power dissipation system while in a first position, and the plurality of adjustable vanes direct the airflow to the component of the engine system while in a second position.

7. A method for a vehicle with an engine system and a power dissipation system, comprising:
    directing airflow from an airflow generating device to cool a component of the power dissipation system; and
    directing the airflow from the airflow generating device to cool a component of the engine system, wherein distinct portions of the airflow are selectively directed from the airflow generating device to cool at least one of the components of the power dissipation system or the component of the engine system based on an operating condition of the vehicle.

8. The method of claim 7, wherein based on the operating condition, the airflow portions are selectively directed from the airflow generating device: in a first mode, to cool the component of the power dissipation system only; in a second mode, to cool the component of the engine system only; and in a third mode, respective portions are directed to cool the component of the power dissipation system and the component of the engine system.

9. A system, comprising:
    an engine system;
    a power dissipation system;
    an airflow generating device coupled between a component of the engine system and a component of the power dissipation system via a plenum, the plenum including a plurality of adjustable vanes operable to adjust an airflow between the component of the power dissipation system and the component of the engine system; and a control module configured to operate the vanes, for adjusting the airflow, responsive to operating conditions.

10. The system of claim 9, wherein the system is positioned in a vehicle, and wherein the component of the power dissipation system comprises a plurality of resistive elements which dissipate electrical energy generated during dynamic braking of the vehicle as heat.

11. The system of claim 9, wherein the control module is configured to operate the vanes for increasing the airflow to the component of the power dissipation system and correspondingly decreasing the airflow to the component of the engine system when a temperature of the component of the power dissipation system is greater than a threshold temperature.

12. The system of claim 9, further comprising a second plenum, wherein the airflow generating device is positioned between the two plenums, and wherein the airflow generating device includes two fans and a double-ended motor which provides power to the two fans, each of the two fans directing airflow to a respective one of the two plenums.

13. The system of claim 9, wherein the component of the engine system is one of an air-to-air heat exchanger, an air-to-oil heat exchanger, and an air-to-water heat exchanger.

14. The system of claim 13, wherein the control module is configured to operate the vanes for increasing the airflow to the heat exchanger of the engine system and correspondingly decreasing the airflow to the component of the power dissipation system when a temperature of air, oil, or water passing through the heat exchanger is greater than a threshold temperature.

15. The system of claim 9, wherein the plurality of adjustable vanes are operable to a first position to increase the airflow to the component of the power dissipation system, and the plurality of adjustable vanes are to a second position to increase the airflow to the component of the engine system.

16. A system for a vehicle, comprising:
an airflow guidance device comprising a plenum and at least one adjustable vane, wherein the plenum has an interior, an input, and first and second outputs, and wherein the at least one adjustable vane is connected to the plenum in the interior between the input and the first and second outputs; and
a control module configured to operate the at least one adjustable vane, based on operating conditions of a vehicle, to a first position of the at least one adjustable vane and to a second position of the at least one adjustable vane, wherein in the first position the at least one adjustable vane is configured to direct airflow entering the input to the first output and wherein in the second position the at least one adjustable vane is configured to direct the airflow to the second output.

17. The system of claim 16, wherein the operating conditions comprise a temperature of a component of a power dissipation system of the vehicle and a temperature of a component of an engine system of the vehicle.

18. The system of claim 17, further comprising first ducting configured to fluidly couple the first output with the component of the power dissipation system of the vehicle and second ducting configured to fluidly couple the second output with the component of the engine system of the vehicle.

19. A dynamic braking package for a vehicle, comprising:
the system of claim 16;
a plurality of resistive elements configured to dissipate electrical energy as heat; and
first ducting fluidly coupling the first output with the plurality of resistive elements.

* * * * *